United States Patent [19]

Tajiri

[11] Patent Number: 5,151,723
[45] Date of Patent: Sep. 29, 1992

[54] MULTIFOCAL CONTACT LENS

[76] Inventor: Akira Tajiri, 1630 Eleventh St., Reedley, Calif. 93654

[21] Appl. No.: 810,569

[22] Filed: Dec. 20, 1991

Related U.S. Application Data

[63] Continuation of Ser. No. 336,122, Apr. 11, 1989, abandoned.

[51] Int. Cl.⁵ .............................................. G03B 21/46
[52] U.S. Cl. .............................. 351/161; 351/160 H; 351/160 R
[58] Field of Search ................ 351/160 R, 160 H, 161

[56] References Cited

U.S. PATENT DOCUMENTS

| | | |
|---|---|---|
| 4,324,461 | 4/1982 | Salvatori . |
| 4,418,991 | 12/1983 | Breger .................................. 351/161 |
| 4,549,794 | 10/1985 | Loshaek et al. . |
| 4,573,775 | 3/1986 | Bayshore . |
| 4,618,229 | 10/1986 | Jacobstein et al. . |
| 4,729,651 | 3/1988 | Kitani . |

Primary Examiner—Paul M. Dzierzynski
Attorney, Agent, or Firm—Bradford E. Kile; Kevin M. O'Brien; Ruffin B. Cordell

[57] ABSTRACT

The invention relates to an improved multifocal contact lens having different segments of near and far vision areas. These areas are arranged asymmetrically about a vertical and horizontal axis of the contact lens.

21 Claims, 2 Drawing Sheets

MULTIFOCAL CONTACT LENS this application is a continuation of Ser. No. 336,122, filed Apr. 11, 1989 now abandoned.

BACKGROUND OF THE INVENTION

This invention relates to an improved multifocal contact lens. More specifically this invention relates to a bifocal contact lens with enhanced near and distance vision characteristics.

Single vision contact lenses have been widely prescribed and successfully worn by the general population for years as an effective alternative to spectacle vision correction. As the population of contact lens wearers approaches the age of forty five or so, however, the physiology of the eye matures, becomes less elastic and loses its ability to focus at near or normal reading distance. This condition is known as presbyopia. The presbyopic population that had previously enjoyed the advantages of single vision contact lens have been highly motivated to continue and consequently have turned to the industry for bifocal contacts.

Unfortunately bifocal contact lenses appearing in the past have encountered certain difficulties, compromises and wearer limitations that has chilled presbyopic patient enthusiasm.

Presently there are three principal types of bifocal contact lenses: (1) simultaneous vision or concentric lenses (2) alternating vision lenses and (3) diffraction or halographic lenses.

Simultaneous vision lenses are physically symmetric in design and are manufactured with a central zone having a prescriptive power suitable for a patient's distant or far vision and a peripheral rim of a different prescriptive value for the patient's near vision. With this type lens a patient simultaneously views objects through both near and far corrective powers. While some presbyopes have been able to adapt well to this lens design, by the brain interpreting the correct image, it will be recognized that a tendency exists for blurring to occur.

In this connection many patients may experience a delay in focusing while others notice a flare around lights or ghost images; one image in-focus and one out-of-focus. This phenomena is exacerbated in instances of low or dim illumination because a wearer's pupil will dilate into the near vision peripheral zone of the lens. Still further, since the pupillary zone is only about three millimeters in diameter, simultaneous vision lenses must center perfectly for a patient to see through the proper area.

An improved simultaneous vision contact lens has now been developed which is often referred to as a holographic or diffraction bifocal lens. This lens comprises a plurality of closely spaced concentric prescriptive values from central distant vision to near vision at an outer periphery. The rings are contoured onto the back or concave surface of the lens. In this lens wavelets come to two focal points: near and distance. Potential limitations of this lens include visual acuity in dim illumination and some degree of continual haziness or blur due to the fact that out-of-focus light is continuously superimposed upon an image that is in focus.

Alternatively presbyopes have been fitted with alternating vision contact lenses which optically resemble bifocal spectacles with a superior segment being formed with a distant vision prescription and an inferior segment fashioned for near vision. In order to maintain the proper orientation of this lens it is necessary to utilize one of a variety of techniques such as prism ballasting, truncation, a combination of truncation and ballasting, and the like.

Although conventional alternate vision lenses can be effectively worn by patient's able to adjust to lens orientation techniques, there are at least some vision problems occasioned with straight ahead or elevated near vision. Specifically, straight forward or elevated near vision, such as might be frequently required by a plumber, painter, etc., dictates tilting one's head backward when wearing a typical alternating vision contact in order to focus through the inferior near vision portion of the lens.

While previously known multifocal contact lenses, such as described above, have achieved a degree of acceptance in the past, room for significant improvement remains. In this regard, it would be highly desirable to provide an enhanced bifocal contact lens which would enable a wearer to view near objects in a straight ahead posture. In a similar vein, it would be advantageous to enable a bifocal contact lens wearer to view objects in a vertically elevated near position without encountering the limitations previously discussed in connection with simultaneous vision lenses. Still further, it would be desirable to provide bifocal contact lens which would provide enhanced dim illumination without flare, ghosting or headlight halo. Yet further, it would be desirable to provide a presbyopic contact lens with elimination of haziness or blur in the field of vision.

The problems suggested in the preceding are not intended to be exhaustive, but rather are among many which might tend to reduce the effectiveness and presbyopic patient satisfaction with previously known multifocal contact lenses. Other noteworthy problems may also exist; however, those presented above should be sufficient to demonstrate that multifocal contact lenses appearing in the past will admit to worthwhile improvement.

OBJECTS AND BRIEF SUMMARY OF THE INVENTION

Objects

It is therefore a general object of the invention to provide a novel multifocal contact lens which will obviate or minimize problems of the type previously described.

It is a specific object of the invention to provide a novel multifocal contact lens where a presbyopic patient's near vision is enhanced in a straight ahead direction.

It is a related object of the invention to provide a novel multifocal contact lens wherein a presbyopic patient's near superior vision is enhanced.

It is another object of the invention to provide a novel multifocal contact lens which provides minimal haziness in the field of vision.

It is still a further object of the invention to provide a novel multifocal contact lens with minimal blurring for a presbyopic patient.

It is yet another object of the invention to provide a novel multifocal contact lens with enhanced distance vision with minimal flare, ghosting and halos particularly at night or with dim illumination.

It is yet still another object of the invention to provide a novel multifocal contact lens which provides enhanced near vision in a vertical spectrum from inferior to superior viewing under all lighting conditions.

Brief summary of A Preferred Embodiment of the Invention

One preferred embodiment of the invention which is intended to accomplish at least some of the foregoing objects comprises a multifocal contact lens having a lens body with a generally convex front portion and concave rear portion operable to conform to the corneal surface of a presbyopic patient. The contact lens body includes an optical center point and at least one near vision prescriptive surface fashioned onto a portion of the lens body in a nasal direction asymmetrically with respect to an imaginary vertical axis extending through the optical center of the lens. At least one far vision prescriptive value is fashioned onto the remaining portion of the surface of the lens body which includes the optical center point of the lens.

THE DRAWINGS

Other objects and advantages of the present invention will become apparent from the following detailed description of preferred embodiments taken in conjunction with the accompanying drawings, wherein.

Figure 6:
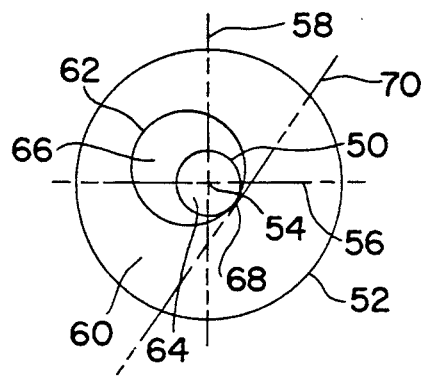
Figure 7:
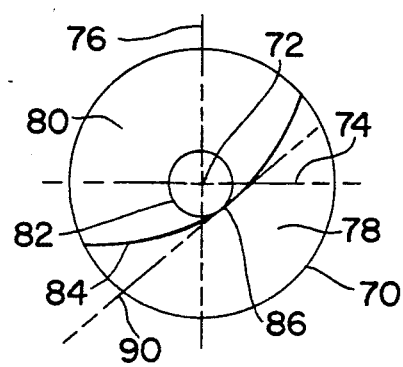

FIG. 6 is a schematic view of an alternate preferred embodiment of the invention wherein a far vision portion of a multifocal contact lens is disclosed as an asymmetric circular area; and FIG. 7 is another alternate preferred embodiment of the invention wherein a far vision prescriptive value is ground or molded onto the surface cf a presbyopic contact lens in the form of an arcuate segment which extends about the optical center of the lens.

DETAILED DESCRIPTION

Referring now to the drawings where in like reference numerals indicate like parts there will be seen various preferred embodiments of the subject invention. Before describing these various embodiments, in detail, however, it may be useful to address the operative context of the invention.

Context Of The Invention

Figure 1:
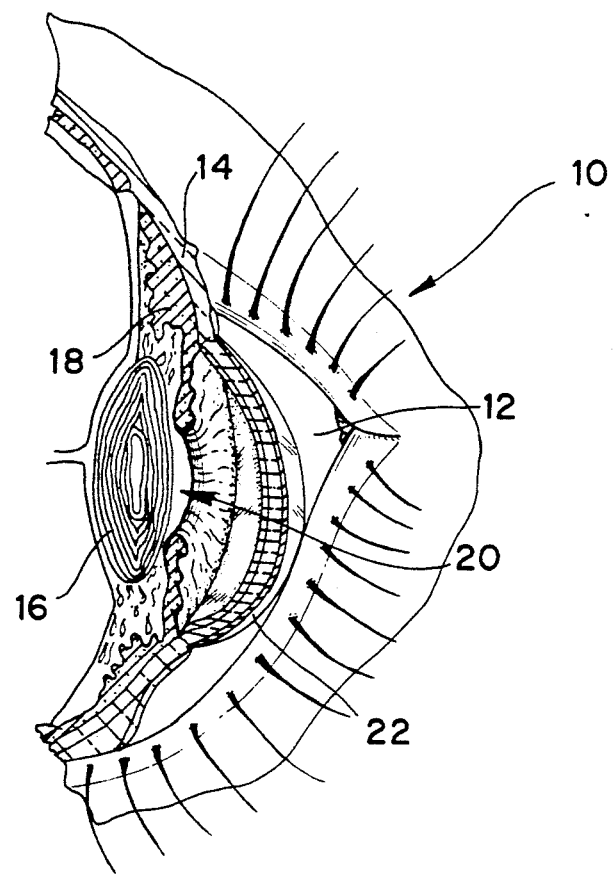
FIG. 1 is an axometric view, partially broken away, disclosing the operative context of the subject invention of the anatomy of a human eye with a multifocal contact lens fitted upon an outer corneal surface for enhancing both near and far binocular vision of a presbyopic patient.

Referring to FIG. 1, there will be seen a schematic representation, in cross section, of a human eye. The anatomy of a human eye 10 includes a forward convex lens called a cornea 12. The cornea extends forward of a generally spherical globe 14 comprising the body of the human eye. Within the globe 14 is a biconvex natural crystalline lens 16. Behind the biconvex lens 16 is the vitreous body and a retina which is connected to an optic nerve. In front of the biconvex lens 16 is a radially dynamic iris diaphragm 18 having a central opening 20 known as a pupil.

In those instances where the combination of the convex cornea lens 12 in cooperation with the biconvex lens 16 is unable to accurately focus images upon the retina of the eye, the focusing function may be operably corrected by the addition of a contact lens 22 which is releasably fitted onto the exterior surface of the cornea 12 in a manner well known in .the art. In this regard the eye is naturally bathed with a preocular tear film (PTF) produced by meibomian glands, lacrimal glands and goblet cells. The PTF provides a film interface between the contact lens and cornea and permits some degree of movement of the lens upon the cornea.

Multifocal Contact Lens

In those instances, as discussed above, where a single focus contact lens is not suitable to properly correct the near vision of presbyopic patients in the age range of 45 and older, a multifocal contact lens may be worn. In this connection, and as viewed particularly in FIG. 2, there will be seen a right eye view and corresponding left eye view of a multifocal contact lens 22 in accordance with a preferred embodiment of the invention. The multifocal contact lens 22 comprises generally circular lens body 24 which includes, in a conventional manner, a generally convex outer surface and a corresponding concave inner surface operable to conform to the corneal curvature of the eye. The lens body includes an optical center 26 and an imaginary horizontal axis 28 intersects a vertical axis 30 through the optical center point of the lens body.

At least one near vision prescriptive value 30 is fashioned onto a portion of the surface of the lens body (either the front or back surface) and extends superiorly and inferiorly with respect to the horizontal axis 28. Moreover, the near vision prescriptive surface 30 includes an asymmetrical portion 32 in the superior nasal quadrant of the lens body. The far vision prescriptive surface includes a circular central optical area 40 having a radius of at least two millimeters and preferably three millimeters.

The asymmetric near vision portion 32 is bound by an imaginary, generally vertical line 36 which extends from a point on central optical area 34 approximately ninety degrees from the vertical in the nasal direction. In a similar manner, the near vision portion is inferiorly bound by a generally horizontal imaginary line 38 extending temporally from the periphery of the central optical distances vision area 34 at a one hundred and eighty degree position.

The central optical far vision zone 34 is subsumed within a larger far vision segment 40 which occupies the segment which is bound by the imaginary vertical line 36 and imaginary horizontal line 38.

The interface along lines 36 and 38, while depicted as a single line from the near vision to far vision surface areas, may in reality comprise a plurality of optical graduations from the near to far vision zone so as to enhance the optical clarity for a presbyopic patient along the interface between the near and far zone. Moreover and further in this connection, while the transition from near vision to far vision has been indicated as comprising a line in reality, this transition may involve one or more millimeters of surface area on either side of the lines 36 and 38.

Figure 2:
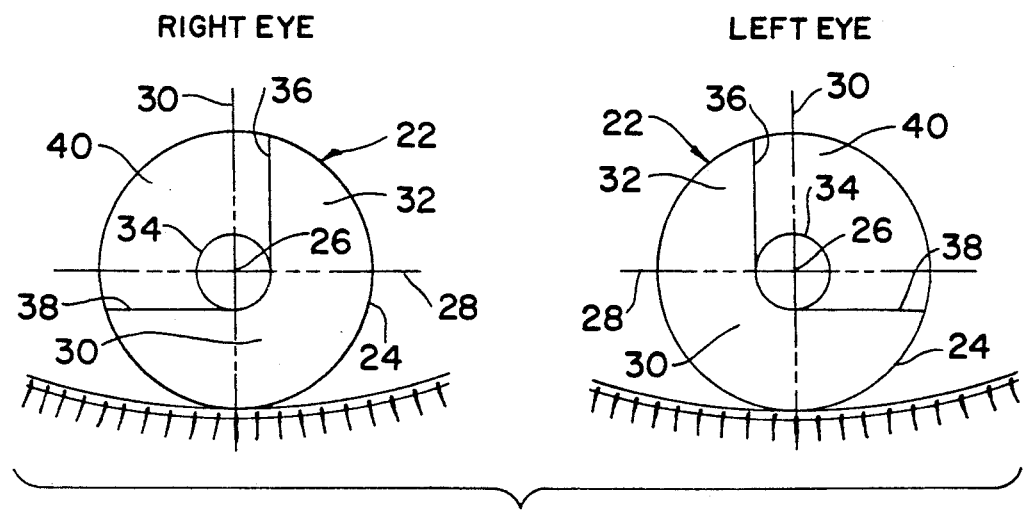
FIG. 2 is a schematic plan view of right eye and left eye multifocal contact lens disclosing a preferred embodiment of the invention wherein the pupil of a presbyopic patient is directed straight forward.
Figure 3:
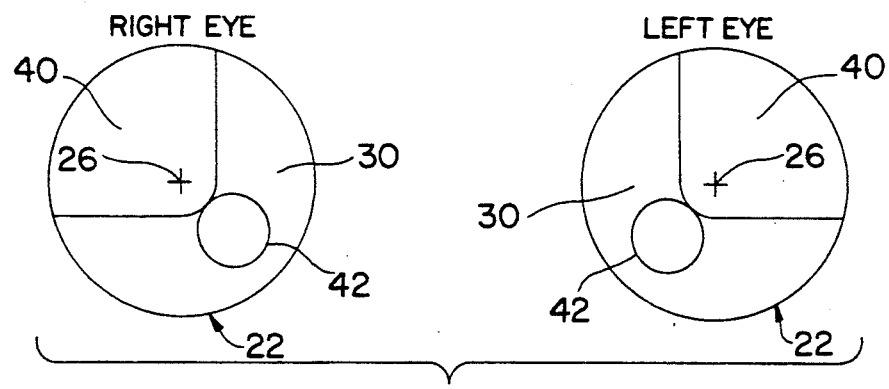
FIG. 3 is a schematic view similar to FIG. 2 wherein a patient's pupils are cast in an inferior and nasal position with respect to the multifocal contact lenses in accordance with a normal reading orientation.
Figure 4:
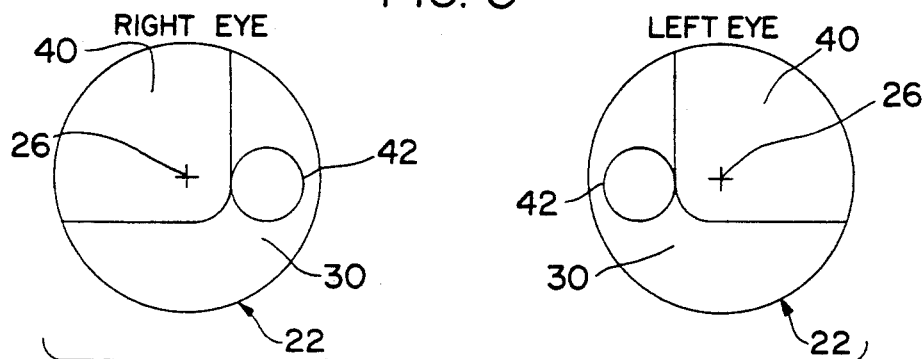
FIG. 4 is a schematic view similar to FIG. 3 wherein a presbyopic patient is looking straight forward but in a near vision perspective.
Figure 5:
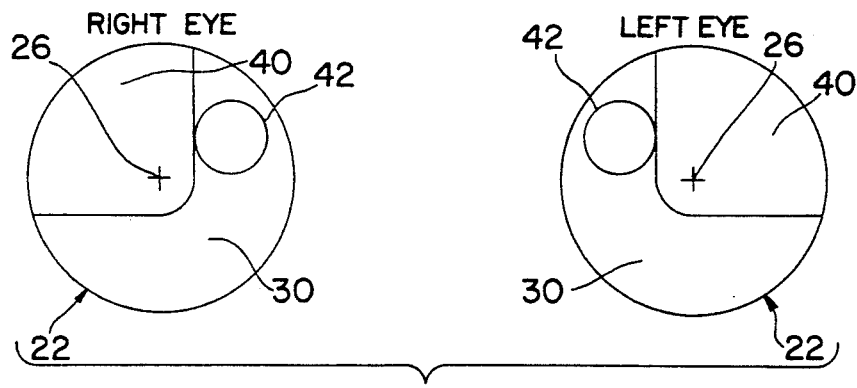
FIG. 5 is a view similar to FIGS. 3 and 4 wherein a presbyopic patient is looking in a near vision superior position.

With reference now to FIGS. 3-5, there will be seen a sequence of right eye and left eye views similar to the views depicted in FIG. 2. FIG. 3 discloses a right eye and left eye multifocal contact lens 22 as described in connection with FIG. 2 wherein a near vision reading position 30 is depicted and the pupil 42 of a wearer's eye has shifted to a inferior and nasal position. In this posture, it will be appreciated that the wearer is viewing near vision subject matter through the near vision surface 30 of the multifocal contact lens 22.

Referring specifically to FIG. 4, there will be seen a similar view wherein the patient's pupils 42 have shifted to a near vision straight toward posture and have remained in a nasal orientation with respect to the optical center 26 of the contact lens 22. In this position it will again be appreciated that the patient's vision has been is directed in all substantial respects with light gathering function through the near vision prescriptive portion 30 of the multifocal contact lens.

FIG. 5 discloses a further view, similar to the views disclosed in FIGS. 2, 3 and 4, wherein a presbyopic patient has shifted ocular focus to a superior near vision position. Again the pupils remain in a nasal offset direction with respect to the optical center 26 of the lens and thus remains within the near vision corrective prescription 30 of the multifocal contact lens.

In the event a presbyopic patient were to view an object at a distance, the patient's pupils would return to a position such as depicted in FIG. 2 and the far vision prescriptive curvature would focus light rays onto the patient's retina.

Referring now specifically to FIG. 6 there will be seen an alternate preferred embodiment of the invention wherein a presbyopic patient's pupil 50 is shown in an optical center portion of a generally circular contact lens body 52. In this embodiment a lens body 52 includes a generally convex outer surface and a generally concave inner surface operable to conform to the corneal curvature of an eye. The lens body 52 includes an optical center point 54 defined by an imaginary central horizontal axis 56 and an imaginary central vertical axis 58 extending across the lens body.

At least one near vision prescriptive value 60 is fashioned upon either the front or back surface of the contact lens 52 and at least one far vision prescriptive value 62 is fashioned onto the same surface of the lens body. The far vision portion 62 includes a circular area 64 about the optical center of the lens body having a radius of, at least, approximately 2 millimeters. A second circular area 66 having a radius in excess of two millimeter extends about and subsumes the first circular area 64 and has a similar far vision prescriptive value. The second area 66 touches an outer peripheral portion of a first circular area 64 at a point 68 which is approximately one hundred thirty five degrees with respect to an imaginary vertical axis 58 of the lens body. At this point of contact 68 imaginary tangent lines 70 of the inner periphery of the enlarged circular area 66 and the outer periphery of the first circular area 64 are coincident as shown in FIG. 6.

In one embodiment of the invention, the radial dimension of the enlarged or second circular area may be at least one half the radial dimension of the lens optic plus one half of the radius of the central circular area such that the enlarged optical circular area 66 exhibiting a far vision prescriptive value lies within the periphery of the multifocal contact lens.

Referring now to FIG. 7, there is a still further preferred embodiment of the invention. FIG. 7 discloses a multifocal contact lens wherein a generally circular contact lens body 70 has a generally convex outer surface and a concave inner surface operable to conform to a corneal curvature of an eye. The lens body includes an optical center point 72 defined by the crossing of a centrally oriented imaginary horizontal axis 74 and an imaginary central vertical axis 76. At least one near vision prescriptive value 78 is fashioned onto the surface of the lens body and at least one far vision prescriptive value 80 is also fashioned onto the same surface.

The far vision portion 78 includes a generally circular area 82 about the optical center 72 of the lens body and has a radius, of at least, approximately 2 millimeters and less than approximately four millimeters.

An arcuate segment 84 is formed on the surface of the lens body and subsumes the circular far vision portion 82 with an identical far vision prescriptive value. The arcuate segment 84 is oriented such that an inner peripheral portion of the arcuate segment touches an outer peripheral portion of the circular area at a one hundred thirty five degree location 86 from the imaginary vertical line 76. At this point of contact, an imaginary tangent line 90 is coincident for both the inner circular portion 82 and the larger arcuate segment 80.

The radius of curvature of the arcuate segment is greater than the radius of the circular lens body but in a preferred embodiment less than twice the radius of the circular lens body 70. This arcuate segment 80 operably defines a near vision portion which is asymmetric and extends into the superior nasal, inferior nasal and inferior temporal regions of the multifocal contact lens body.

Each of the foregoing embodiments of the subject multifocal contact lens require orientation when worn with a patient's eye. This orientation may be provided by conventional techniques such as prism ballasting, truncating, diameter sizing, symmetrical and asymmetrical lens shapes, chamfering, thinning, thickening in any area of the lens to facilitate orientation and shifting of the lens relative to the line of sight.

The lens body may be composed of conventional hard contact lens material such as polymethylmethacrylate (PMMA), cellulose acetate butyrate, and the like. Moreover, soft lenses may be utilized as fashioned from polyhydroxyethylmethacrylate (HEMA), copolymers of HEMA and capnal N-vinyl-pyrrolidone (NVP), silicone or other materials known to be useful in the fabrication of soft contact lenses.

SUMMARY OF MAJOR ADVANTAGES OF THE INVENTION

In describing a multifocal contact lens in accordance with preferred embodiments of the invention those skilled in the art will recognize several advantages which singularly distinguish the subject invention from heretofore known multifocal contact lenses. A particular advantage of the subject invention is the provision of asymmetric near vision in the superior nasal segment of the contact lens to enable a bifocal lens wearer to be accorded near vision vertical acuity heretofore unknown in the multifocal contact lens art.

In a preferred embodiment a far vision segment is enlarged with respect to previously known concentric bifocal contact lenses to permit enhanced distance vision with minimal flare particularly dim illumination. The relatively large far distance segment allows more light gathering to provide clear and brighter distance vision under all forms of lighting conditions.

The near vision value of a presbyopic patient fitted with the subject lens is enhanced not only in the vertical posture but is maintained in the horizontal reading posture.

In describing the invention, reference has been made to preferred embodiments. Those skilled in the art, however, and familiar with the disclosure of the subject invention, may recognize additions, deletions, modifications, substitutions and/or other changes which will fall within the purview of the claims of the invention as defined in the following:

What is claimed is:

1. A multifocal contact lens comprising:
   a generally spherical lens body having,
      a generally convex outer surface,
      a generally concave inner surface operable to conform to the corneal curvature of an eye, and
      the lens body includes an optical center point and a horizontal axis and a vertical axis which intersect through the optical center point of the lens body said axes being horizontal and vertical in the sense of the lens being worn on the eye of a patient in a generally erect posture;
   at least one near vision prescriptive value fashioned onto a portion of the surface of said lens body and extending superiorly and inferior with respect to said horizontal axis and in the superior portion asymmetrically in a nasal direction with respect to the vertical axis and in the inferior temporal portion asymmetrically in the inferior direction with respect to the horizontal axis;
   at least one far vision prescriptive value fashioned onto the remaining portion of the surface of said lens body, said remaining portion having the far vision prescriptive value including at least the optical center point of said lens body and the superior and temporal portions of the lens body with respect to the horizontal and vertical axis respectively.

2. A multifocal contact lens as defined in claim 1 wherein:
   said far vision prescriptive value fashioned onto said remaining portion of the surface of said lens body includes a circular area about said optical center of said lens body.

3. A multifocal contact lens as defined in claim 2 wherein:
   the radius of said circular far vision, central, area is, at least, approximately two millimeters.

4. A multifocal contact lens as defined in claim 2 wherein:
   the radius of said far vision, central, circular area is, at least, approximately three millimeters.

5. A multifocal contact lens as defined in claims 3 wherein:
   said near vision prescriptive value surface includes a portion which is fashioned onto the surface of said lens body in a manner that extends inferiorly from an imaginary horizontal line extending across said lens body, at least approximately two millimeters below the horizontal axis extending through the optical center of said lens body and tangent, at one hundred eighty degrees to the inferior periphery of said circular area of far vision.

6. A multifocal contact lens as defined in claim 4 wherein:
   said near vision prescriptive value includes a portion which is fashioned onto the surface of said lens body in a manner that extends inferiorly from an imaginary horizontal line extending across said lens body, at least approximately three millimeters below the horizontal axis extending through the optical center of said lens body and tangent, at one hundred eighty degrees to the inferior periphery of said circular area of far vision.

7. A multifocal contact lens as defined in claim 5 wherein:
   said near vision prescriptive value includes a portion which is fashioned onto the surface of said lens body in a manner that extends equally superiorly and inferiorly with respect to said horizontal axis extending through the optical center of said lens body and nasally from an imaginary vertical line extending parallel to said vertical axis extending through the optical center of said lens body, at least, approximately two millimeters nasally and tangent to the nasal periphery of said circular area of far vision.

8. A multifocal contact lens as defined in clam 6 wherein:
   said near vision prescriptive value includes a portion which is fashioned onto the surface of said lens body in a manner that extends equally superiorly and inferiorly with respect to said imaginary horizontal axis extending through the optical center of said lens body and nasally from an imaginary vertical line extending parallel to said vertical axis extending through the optical center of said lens body, at least, approximately three millimeters nasally and tangent to the nasal periphery of said circular area of far vision.

9. A multifocal contact lens as defined in claim 3 wherein:
   said near vision prescriptive value includes a portion which is fashioned onto the surface of said lens body in a manner that extends equally superiorly and inferiorly with respect to said horizontal axis extending through the optical center of said lens body and nasally from an imaginary vertical line extending parallel to said vertical axis extending through the optical center of said lens body, at least, approximately two millimeters nasally and tangent to the nasal periphery of said circular area of far vision.

10. A multifocal contact lens as defined in claim 4 wherein:
    said near vision prescriptive value includes a portion which is fashioned onto the surface of said lens body in a manner that extends equally superiorly and inferiorly with erspect to said horizontal axis extending through the optical center of said lens body and nasally from an imaginary vertical line extending parallel to said vertical axis extending through the optical center of said lens body, at least, approximately three millimeters nasally and tangent to the nasal periphery of said circular area of far vision.

11. A multifocal contact lens comprising:
    a lens body having,
       a generally convex outer surface,
       a generally concave inner surface operable to conform to the corneal curvature of an eye, and the lens body includes an optical center point defined by a central, horizontal axis and a central vertical axis extending across the lens body;

at least one near vision prescriptive value fashioned asymmetrically onto the surface of said lens body with respect to said horizontal and vertical axis;

at least one far vision prescriptive value fashioned asymmetrically onto the remaining surface of said lens body, said far vision portion including a circular area about said optical center point of said lens body and having a radius of, at least, approximately two millimeters, and a segment subsuming said circular area about said optical center point and being bound on one margin by a generally vertical imaginary line extending tangentially from a point on said far vision circular area nasally ninety degrees from the central vertical axis and projecting superiorly and further bound by a generally horizontal imaginary line extending tangentially from a point on said far vision circular area at a one hundred and eighty degree position and projecting temporarily away from a nasal direction.

12. A multifocal contact lens as defined in claim 11 wherein:

said circular area of far vision about said optical center point of said lens body having a radius of, at least, approximately two millimeters, has a radius of, at least, approximately three millimeters.

13. A multifocal contact lens comprising:

a lens body having, a generally convex outer surface, a generally concave inner surface operable to conform to the corneal curvature of an eye, and the lens body includes an optical center point defined by a central, horizontal axis and a central, vertical axis extending across the lens body;

at least one near vision prescriptive value fashioned asymmetrically onto a portion of a surface of said lens body with respect to said horizontal and vertical axis; and at least one far vision prescriptive value fashioned onto the remaining portion of the surface of said lens body, said far vision portion including a first circular area formed about said optical center point of said lens body and having a radius, at least, approximately two millimeters, and a second circular area formed upon the surface of said lens body, said second circular area having a radius greater than two millimeters, said second circular area subsuming said first circular area and being oriented upon said lens body such that an inner peripheral portion of said second circular area touches an outer peripheral portion of said first circular area at a one hundred thirty five degree position of said first circular area with respect to said central, vertical axis in a nasal direction of said multifocal contact lens and having coincidental imaginary tangent lines.

14. A multifocal contact lens as defined in claim 13 wherein:

said, at least, approximately two millimeter radius of said first circular area of far vision comprises, at least, approximately three millimeters.

15. A multifocal contact lens as defined in claim 13 wherein:

said lens body is circular and the radius of said second, circular area is less than or equal to one half the radius of said circular lens body plus, at least, one millimeter.

16. A multifocal contact lens comprising: a generally circular body having, a generally convex outer surface, a generally concave inner surface operable to conform to the corneal curvature of an eye, and said lens body includes an optical center point defined by a central, horizontal axis and a central, vertical axis extending across said lens body;

at least one near vision prescriptive value fashioned asymmetrically onto a portion of the surface of said lens body with respect to said horizontal and vertical axis; and at least one far vision prescriptive value fashioned onto the remaining portion of the surface of said lens body, said far vision portion including a circular area about said optical center point of said generally circular lens body and having a radius, at least, approximately two millimeters, and an arcuate segment formed upon the surface of said generally circular lens body, said arcuate segment subsuming said circular area about said optical center point and being oriented upon said generally circular lens body such that an inner peripheral portion of said arcuate segment, touching an outer peripheral portion of said circular area about said optical center point from said nasally one hundred thirty five degree imaginary vertical axis and said circular are and said arcuate segment having coincident tangent lines at said point of contact.

17. A multifocal contact lens as defined in claim 16 wherein:

the radius of said arcuate segment is greater than the radius of said circular lens body but less than twice the radius of said circular lens body.

18. A multifocal contact lens as defined in claim 17 wherein:

said, at least, approximately two millimeter radius of said circular area of far vision comprises, at least, approximately three millimeters.

19. A multifocal contact lens comprising:

a lens body having, a generally convex outer surface, a generally concave inner surface operable to conform to the corneal curvature of an eye, and the lens body includes an optical center point defined by a central, horizontal axis and a central vertical axis extending across the lens body said horizontal and vertical axis serving to define four zones on said lens body consisting of a superior nasal zone, an inferior nasal zone, an inferior temporal zone and a superior temporal zone;

at least one near vision prescriptive value fashioned asymmetrically onto the surface of said lens body at least in part within the inferior temporal zone; and at least one far vision prescriptive value fashioned asymmetrically onto the surface of the remaining portions of the lens body and extending at least in part into the superior nasal zone, the inferior temporal zone and the superior temporal zone.

20. A multifocal contact lens as defined in claim 19 wherein; said at least one far vision prescriptive value is further fashioned onto at least a part of said inferior temporal zone.

21. A multifocal contact lens as defined in claim 20 wherein:
said at least one near vision prescriptive value is further fashioned onto at least a part of said superior nasal zone and said inferior temporal zone.

* * * * *